United States Patent [19]

Sudo et al.

[11] Patent Number: 5,381,175
[45] Date of Patent: Jan. 10, 1995

[54] APPARATUS FOR CORRECTING FOR DEFECTIVE PIXELS IN AN IMAGE SENSOR

[75] Inventors: Fumihiko Sudo; Taku Kihara, both of Kanagawa, Japan

[73] Assignee: Sony Corporation, Tokyo, Japan

[21] Appl. No.: 42,769

[22] Filed: Apr. 6, 1993

[30] Foreign Application Priority Data

Apr. 10, 1992 [JP] Japan .................................. 4-091201

[51] Int. Cl.⁶ .............................................. H04N 3/14
[52] U.S. Cl. ..................................... 348/246; 348/247
[58] Field of Search ................ 348/246, 247, 241, 251; H04N 3/14, 3/15

[56] References Cited

U.S. PATENT DOCUMENTS

| | | | |
|---|---|---|---|
| 4,894,721 | 1/1990 | Matsuda | 348/247 X |
| 5,144,446 | 9/1992 | Sudo et al. | 348/246 |
| 5,198,906 | 3/1993 | Yamashita | 348/246 |

Primary Examiner—Joseph Mancuso
Assistant Examiner—Wendy R. Greening
Attorney, Agent, or Firm—William S. Frommer; Alvin Sinderbrand

[57] ABSTRACT

A solid state image pickup apparatus comprises a solid state imager having a plurality of pixels and which outputs a signal corresponding to light incident thereon, a sample and hold circuit for sampling and holding analog output signals from respective pixels of the solid state imager in response to a sampling signal, a low-pass filter connected to the analog output of the sample and hold circuit for eliminating a high frequency component therefrom so as to output a filtered signal, an analog-to-digital converter for converting the filtered signal to a digital filtered signal, a memory for storing position data indicative of a position of a defective pixel, a circuit for stopping the supply of the sampling signal to the sample and hold circuit in response to the position data indicating a defective pixel so that the output signal from the defective pixel is replaced with the analog output signal from a pixel read immediately prior thereto, an interpolating circuit connected to the analog-to-digital converter for interpolating a digital signal corresponding to the position data indicating a defective pixel by using the digital signals corresponding to other pixels surrounding the defective pixel so as to generate an interpolated signal, and a switch for selectively outputting the digital filtered signal and the interpolated signal in accordance with the position data.

4 Claims, 2 Drawing Sheets

APPARATUS FOR CORRECTING FOR DEFECTIVE PIXELS IN AN IMAGE SENSOR

BACKGROUND OF THE INVENTION

1. Field of the Invention

The present invention generally relates to solid state image pickup apparatus and, more particularly, to a CCD (charge coupled device) defective pixel correcting circuit for use in a video camera or the like, for example.

2. Description of the Prior Art

In conventional video cameras using a solid state image pickup device such as a CCD or the like, there is utilized a defective pixel correcting circuit for correcting a so-called defective pixel that is one of the pixels of the CCD. The defective pixel is produced when or after the CCD is manufactured and outputs a signal of a characteristic level.

Further, there is known a video camera in which an analog output signal from a CCD is converted into a digital signal and then a desired processing is effected in a digital fashion. In such a video camera which carries out the digital signal processing, a defective pixel correcting circuit detects a defective pixel of the CCD in advance, and stores position data and various data relating to the defective pixel in a ROM (read only memory) or the like. Then, when the video camera is in use, the analog signal from the defective pixel is supplied with the video signal from the other pixels of the CCD through a low-pass filter to an analog-to-digital converter and then the pixel data from the defective pixel is replaced by means of video data output from a pixel near the defective pixel. Therefore, in the video signal obtained from the CCD, the pixel data output from a defective pixel which generates a signal of a particular level can be substantially corrected and a satisfactory reproduced image can be obtained. The above technique has been proposed by the assignee of the present application and is specifically disclosed in U.S. Pat. No. 5,144,446.

In the above CCD defective pixel correcting circuit, the analog output from the CCD is supplied through a low-pass filter and converted into a digital signal by the analog-to-digital converter. Then, of the digital signals from the analog-to-digital converter, the digital signal identified by the position data representative of the defective pixel is used in interpolating a digital signal to replace the output of the defective pixel. The reason that the analog output from the CCD is processed by the low-pass filter prior to the processing by the analog-to-digital converter is to prevent a false signal from being produced when the sampling is carried out in the analog-to-digital converter.

FIGS. 1A and 1B show the condition that the output from the defective pixel in the CCD is filtered by the low-pass filter.

When the output from the defective pixel as shown in FIG. 1A is filtered by the low-pass filter, a waveform of the signal is widened by the characteristic of the low-pass filter as shown in FIG. 1B. Accordingly, when the signal shown in FIG. 1B is converted by the analog-to-digital converter, there is generated a signal which is different from the defective pixel output (see FIG. 1A) of the CCD. If this signal is interpolated, then the signal having the widened waveform is output as it is because this signal is interpolated in response to the output of the defective pixel shown in FIG. 1A.

Therefore, there is proposed an interpolation technique prior to the analog to digital conversion, and in which the defective pixel data is replaced with preceding pixel data by holding pixel data corresponding to the position of a defective pixel of a CCD output by a sample and hold circuit. However, according to such interpolation technique, as shown in FIG. 2, when an image pattern is displayed with a frequency increased, particularly, in the horizontal direction, the correction of a defective pixel output by replacing the same with the preceding pixel output, as at h, has the disadvantage that a quality of a displayed image is deteriorated considerably.

Further, when a defective pixel is corrected by interpolation using pixel data near the defective pixel output in the CCD output, a time lag occurs between a signal processing system for processing the CCD output and an interpolation system for interpolating the defective pixel. There is then the possibility that a defective pixel cannot be corrected accurately.

OBJECTS AND SUMMARY OF THE INVENTION

In view of the aforesaid shortcomings and disadvantages of the prior art, it is an object of the present invention to provide a CCD defective pixel correcting circuit which can eliminate influence of a low-pass filter characteristic upon interpolation of a defective pixel output so that a defective pixel output can be corrected reliably.

It is another object of the present invention to provide a CCD defective pixel correcting circuit which can provide a reproduced picture of high quality.

It is a further object of the present invention to provide a CCD defective pixel correcting circuit in which a defective pixel output can be corrected accurately and in a satisfactory manner.

According to an aspect of the present invention, there is provided a solid state image pickup apparatus which comprises a solid state imager having a plurality of pixels and which outputs an analog signal corresponding to light incident thereon, a sample and hold circuit for sampling and holding the analog signal output from the pixels of the solid state imager in response to a sampling signal, a low-pass filter connected to the sample and hold circuit for eliminating a high frequency component from the output signal of the sample and hold circuit so as to output a filtered signal, an analog-to-digital converter connected to the low-pass filter for converting the filtered signal to a digital filtered signal, a memory for storing position data indicative of a position of a defective pixel which outputs a signal of a characteristic level, a circuit for stopping the supply of the sampling signal to the sample and hold circuit in accordance with the position data so that the analog output signal from a defective pixel is replaced with the analog output signal from a pixel which is read immediately prior to the defective pixel, an interpolating circuit receiving the digital filtered signal from the analog-to-digital converter for interpolating a digital signal in place of the digital signal corresponding to the position data indicating a defective pixel from the digital filtered signal corresponding to adjacent pixels so as to generate an interpolated signal, and a switch for selectively outputting the digital filtered signal and the interpolated signal in accordance with the position data.

The above and other objects, features, and advantages of the present invention will become apparent from the following detailed description of an illustrative embodiment thereof to be read in conjunction with the accompanying drawings.

DETAILED DESCRIPTION OF THE PREFERRED EMBODIMENT

A CCD defective pixel correcting circuit according to an embodiment of the present invention will hereinafter be described with reference to FIG. 3.

Figure 1A:
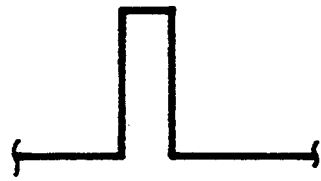
FIGS. 1A and 1B are diagrams used to explain how an output of a defective pixel is influenced by a low-pass filter characteristic.
Figure 1B:
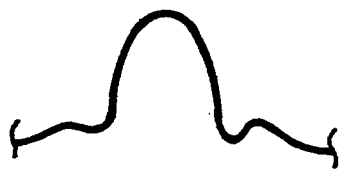
Figure 2:
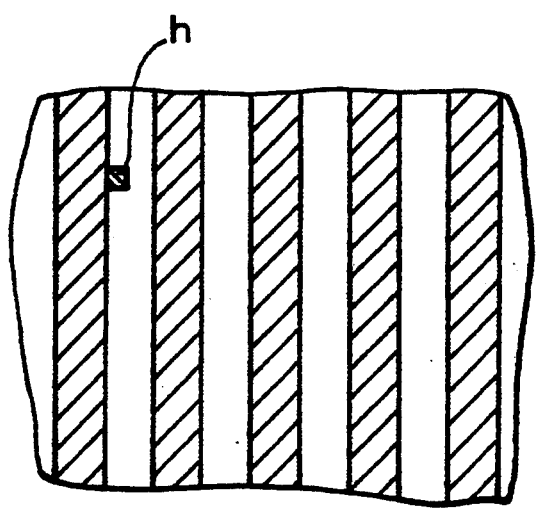
FIG. 2 is a diagram showing a deterioration occurring in a reproduced picture when a defective pixel is corrected without removing influence of the low-pass filter characteristic on the output of the defective pixel.
Figure 3:
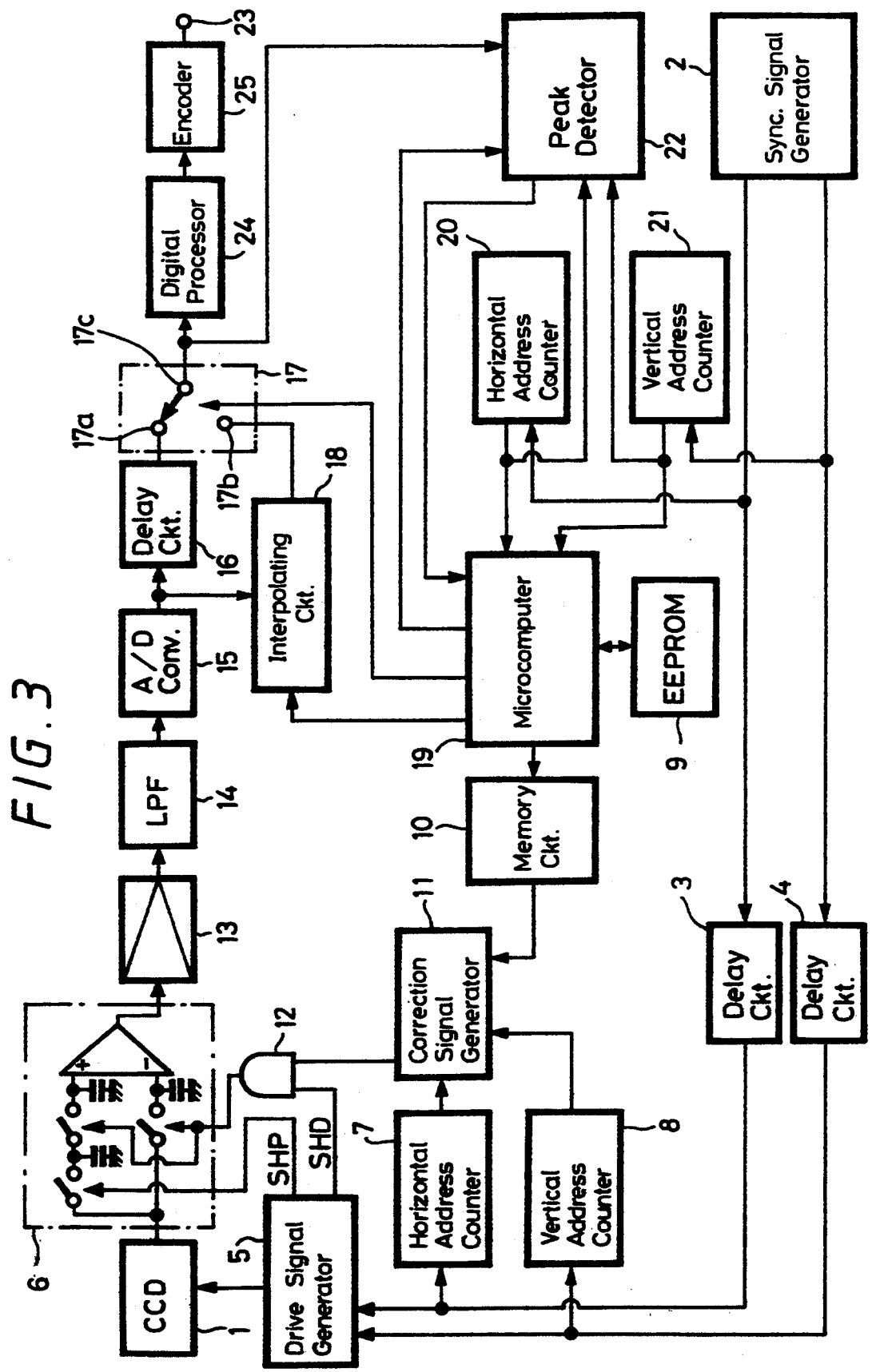
FIG. 3 is a block diagram showing a CCD defective pixel correcting circuit according to an embodiment of the present invention.

As shown in FIG. 3, there is provided a CCD which might be of a three-chip CCD of red, green and blue colors, a one-chip or two-chip CCD. The CCD 1 photoelectrically converts a light from an optical lens (not shown) into an electrical signal and outputs this electrical signal on the basis of a control signal from a drive signal generator 5. The output signal from the CCD 1 is supplied to a correlated-double-sampling circuit 6.

The correlated-double-sampling circuit 6 effects a sampling of a reset level of the output signal from the CCD 1 by a sampling signal SHP from the drive signal generator 5 and also effects a sampling of a video level of the output signal from the CCD 1 on the basis of a control signal from an AND circuit 12. An analog output (hereinafter referred to as a video signal) from the correlated-double-sampling circuit 6 is supplied through a video amplifier circuit 13 and a low-pass filter (LPF) 14 to an analog-to-digital (A/D) converter 15 and converted into a digital signal by the analog-to-digital converter 15.

The control signal output from the AND circuit 12 is an AND output of the sampling signal SHD of the video level from the drive signal generator 5 and a correction signal from a correction signal generator 11. The correction signal generator 11 generates a correction signal on the basis of defective pixel position data or the like stored in a memory circuit (e.g., formed of a RAM (random access memory) and a RAM controller) by a microcomputer 19, a horizontal address signal from a horizontal address counter 7 and a vertical address signal from a vertical address counter 8.

The video data constituting the digital signal output by the analog-to-digital converter 15 is delayed by a delay circuit 16 for a delay time corresponding to a processing time of an interpolation circuit 18, which will be described later on, and then supplied to a fixed contact 17a of a switch 17. The video data forming the digital signal is supplied to a digital processor 24 whose output is delivered through an encoder 25 to an output terminal 23.

The interpolation circuit 18 is supplied with video data from the analog-to-digital converter 15 and stores video data from pixels near the defective pixel in a register (not shown) on the basis of defective pixel position data read out from an EEPROM (electrically erasable and programmable read only memory) 9 by the microcomputer 19. The interpolation circuit 18 generates data corresponding to video data of defective pixel by interpolating the video data from pixels adjacent to the defective pixel, as hereinafter further described.

Defective pixel position data is stored in advance in the EEPROM 9 when a video camera having this CCD defective pixel correcting circuit mounted thereon is delivered. After the above video camera is delivered, defective pixel position data newly detected by a peak detector 22, for example, is stored in the EEPROM 9.

The peak detector 22 eliminates, for example, by a high-pass filter, not shown, a direct current component from the video data supplied thereto through the switch 17. Thereafter, the peak detector 22 compares the level of the video data thus processed with the level of the preceding video data. When the peak detector 22 detects that the level of the video data thus supplied is larger than that of the preceding video data, the level of the video data now supplied (output of the high-pass filter) is selected to be a new reference value and temporarily stores therein horizontal and vertical addresses of horizontal and vertical address counters 20 and 21, which identify defective pixel addresses in addition to those originally stored in the EEPROM 9. The stored data such as the additional defective pixel addresses, etc., are read from the peak detector 22 and written in the EEPROM 9 by the microcomputer 19.

The horizontal address counter 20 and the vertical address counter 21 are respectively operated on the basis of the horizontal and vertical synchronizing (sync.) signals from a sync. signal generator 2. The horizontal sync. signal output from the sync. signal generator 2 is delayed for a predetermined delay time by a delay circuit 3 and then supplied to the drive signal generator 5 and the horizontal address counter 7. The vertical sync. signal from the sync. signal generator 2 is delayed by a predetermined delay time by a delay circuit 4 and then supplied to the drive signal generator 5 and a vertical address counter 8.

The delay circuits 3 and 4 are provided so that the pixel data supplied to the fixed contact 17a of the switch 17 can be accurately replaced by the corrected or interpolated data supplied to the fixed contact 17b of the switch 17 and then output when the pixel data supplied to the fixed contact 17a is from the defective pixel. More specifically, the horizontal and vertical synchronizing signals from the sync. signal generator 2 are advanced in phase in order to compensate for a delay time produced from the video amplifier circuit 13 to the delay circuit 16. Although it is difficult to advance the phase of the signals from the generator 2, in actual practice, the horizontal and vertical synchronizing signals from generator 2 are delayed by a delay time which results from subtracting a delay time of a main line system from a cycle of a reference signal in the signal processing system.

Operation of the CCD defective pixel correcting circuit will be described below.

When the video camera having the CCD defective pixel correcting circuit mounted thereon is powered, the microcomputer 19 reads out the defective pixel data stored in the EEPROM 9 and writes the defective pixel position data thus read in the memory circuit 10. When the horizontal and vertical synchronizing signals generated from the sync. signal generator 2 are respectively delayed by the delay circuits 3, 4 and then supplied to the drive signal generator 5, the drive signal generator 5 supplies a read control signal to the CCD 1, the reset level sampling signal SHP to the correlated-double-sampling circuit 6 and the video level sampling signal SHD to the AND circuit 12 on the basis of the delayed horizontal and vertical synchronizing signals supplied thereto.

The horizontal and vertical synchronizing signals generated from the sync. signal generator 2 and delayed by the delay circuits 3, 4 are respectively supplied to the horizontal address counter 7 and the vertical address counter 8 so that the horizontal address counter 7 and the vertical address counter 8 are reset, respectively. Thereafter, the horizontal address counter 7 and the vertical address counter 8 start the count operation. On the other hand, defective pixel position data is read out from the memory circuit 10 and supplied to the correction signal generator 11. The correction signal generator 11 generates a correction signal on the basis of the defective pixel position data supplied thereto from the memory circuit 10 and the horizontal and vertical address signals supplied thereto from the horizontal address counter 7 and the vertical address counter 8, and supplies the correction signal to the AND circuit 12.

More specifically, the correction signal generator 11 supplies the correction signal to the AND circuit 12 whenever the address signals from the horizontal address counter 7 and the vertical address counter 8 become coincident with the defective pixel position data from the memory circuit 10.

Therefore, an output of the AND circuit 12 becomes a signal which causes the sampling circuit 6 to hold a previous value when the defective pixel output is supplied to the correlated-double-sampling circuit 6. Thus, when the defective pixel output is supplied to the correlated-double-sampling circuit 6, the defective pixel output, is replaced in the signal supplied to the A/D converter 15, with the output of the previous pixel.

A pixel output from the correlated-double-sampling circuit 6 is supplied through the video amplifier circuit 13 and the low-pass filter circuit 14 to the analog-to-digital converter 15, in which it is converted into a digital signal and then supplied to the interpolating circuit 18 and the delay circuit 16, respectively.

The pixel data, delayed by the delay time corresponding to the processing time of the interpolating circuit 18 by the delay circuit 16, is supplied to the fixed contact 17a of the switch 17. On the other hand, in respect to the pixel data supplied to the interpolating circuit 18, if the pixel data is that supplied by the double-sampling circuit 6 in place of the defect pixel output, then pixel data around (upper and lower, left and right, upper left, upper right, lower left, lower right, etc.) the defective pixel, and which have been stored in advance in the registers of the interpolating circuit 18 are employed by the latter for obtaining interpolated pixel data in response to the control signal from the microcomputer 19. Thus, interpolation data having high correlation with pixel data based on the defective pixel is selected by the calculation based on the interpolation and the interpolation data thus selected is supplied to the fixed contact 17b of the switch 17.

The microcomputer 19 generates a switching signal (interpolation pulse) on the basis of the horizontal address signal from the horizontal address counter 20, the vertical address signal from the vertical address counter 21 and the position data indicative of the defective pixel data from the EEPROM 9 to change the position of the switch 17.

More specifically, when the pixel data supplied from the circuit 6 in place of the defective pixel data is supplied to the fixed contact 17a of the switch 17, the movable contact 17c of the switch 17 is connected to the fixed contact 17b. In other cases, the movable contact 17c of the switch 17 is connected to the fixed contact 17a.

Thus, when the pixel data supplied to the fixed contact 17a of the switch 17 corresponds to the defective pixel, such pixel output is replaced with the interpolation data from the interpolation circuit 18.

As described above, according to this embodiment, since the defective pixel output is initially replaced by holding the value of the previous pixel and the pixel output thus replaced is thereafter converted to digital data and interpolated by data of pixels positioned near the defective pixel, the influence of the low-pass filter characteristic can be eliminated and the quality of the output image can be improved considerably.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A solid state image pickup apparatus comprising:
   a solid state imager having a plurality of pixels which output analog signals corresponding to light incident thereon;
   a sample and hold circuit for sampling and holding said analog signals output from respective pixels of said solid state imager in response to a sampling signal;
   a low-pass filter connected to said sample and hold circuit for eliminating a high frequency component from the analog output signal of said sample and hold circuit so as to output a filtered signal;
   an analog-to-digital converter connected to said low-pass filter for converting the filtered signal to a digital filtered signal;
   a memory for storing position data indicative of a position of a defective pixel;
   means for stopping supplying of said sampling signal to said sample and hold circuit in accordance with said position data so that the analog output signal from a respective defective pixel is replaced with the analog output signal from the pixel which is read immediately prior to the defective pixel;
   interpolating means connected to said analog-to-digital converter for interpolating a digital signal in place of the digital signal corresponding to the position data indicating a defective pixel from digital signals corresponding to other pixels in surrounding relation to the defective pixel so as to generate an interpolated digital signal; and
   switching means for selectively outputting the digital filtered signal and the interpolated digital signal in accordance with said position data.

2. A solid state image pickup apparatus according to claim 1, further comprising delay means connected between said analog-to-digital converter and said switching means for delaying the digital filtered signal, the delay time of said delay means being equal to the delay time of said interpolating means.

3. A solid state image pickup apparatus according to claim 1, wherein said sample and hold circuit is a correlated-double-sampling circuit.

4. A solid state image pickup apparatus according to claim 1, in which said interpolating means forms said interpolated digital signal from digital signals corresponding to eight of said pixels in surrounding relation to said defective pixel.

* * * * *